United States Patent [19]

Kaneko

[11] Patent Number: 5,331,141
[45] Date of Patent: Jul. 19, 1994

[54] BAR CODE READER AND GAME SET USING THE SAME

[75] Inventor: Fukashi Kaneko, Tokyo, Japan
[73] Assignee: APE, Inc., Tokyo, Japan
[21] Appl. No.: 961,886
[22] PCT Filed: May 6, 1992
[86] PCT No.: PCT/JP92/00591
  § 371 Date: Jan. 11, 1993
  § 102(e) Date: Jan. 11, 1993
[87] PCT Pub. No.: WO92/21100
  PCT Pub. Date: Nov. 26, 1992

[30] Foreign Application Priority Data

May 10, 1991 [JP] Japan .................. 3-135712

[51] Int. Cl.5 .............................. G06K 7/10
[52] U.S. Cl. .................. 235/462; 235/463; 235/375
[58] Field of Search .......... 235/462, 463, 467, 438, 235/375; 250/568

[56] References Cited

U.S. PATENT DOCUMENTS

| | | | |
|---|---|---|---|
| 4,112,422 | 9/1978 | Mayer et al. | 340/324 |
| 4,363,489 | 12/1982 | Chodak et al. | 273/237 |
| 4,373,719 | 2/1983 | Nelson et al. | 273/1 |
| 4,373,726 | 2/1983 | Churchill et al. | 273/138 |
| 4,410,181 | 10/1983 | Lapp et al. | 273/238 |
| 4,434,460 | 2/1984 | Drakenborn et al. | 364/200 |
| 4,494,197 | 1/1985 | Troy et al. | 364/412 |
| 4,534,562 | 8/1985 | Cuff et al. | 273/149 |
| 4,573,954 | 3/1986 | Berger et al. | 493/55 |
| 4,651,995 | 3/1987 | Henkel | 273/237 |
| 4,662,637 | 5/1987 | Pfeiffer | 273/149 |
| 4,667,089 | 5/1987 | Shirakabe et al. | 235/462 |
| 4,669,729 | 6/1987 | Solitt et al. | 273/138 |
| 4,681,548 | 7/1987 | Lemelson | 434/311 |
| 4,689,742 | 8/1987 | Troy et al. | 364/412 |
| 4,695,058 | 9/1987 | Carter, III et al. | 273/311 |
| 4,729,564 | 3/1988 | Kuna et al. | 273/1 E |
| 4,746,789 | 5/1988 | Gieles et al. | 235/463 |
| 4,840,382 | 6/1989 | Rubin | 273/237 |
| 4,863,173 | 9/1989 | Chen | 273/237 |
| 4,958,837 | 9/1990 | Russell | 273/237 |
| 5,026,058 | 6/1991 | Bromley | 273/93 |
| 5,245,167 | 9/1993 | Takenaka . | |

FOREIGN PATENT DOCUMENTS

| | | |
|---|---|---|
| 2715598 | 11/1977 | Fed. Rep. of Germany . |
| 61-262886 | 11/1986 | Japan . |
| 62-279479 | 12/1987 | Japan . |
| 1-290092 | 11/1989 | Japan . |
| 2-11183 | 1/1990 | Japan . |
| 2-135581 | 5/1990 | Japan . |
| 2161629 | 1/1986 | United Kingdom . |
| 2230462 | 10/1990 | United Kingdom . |

Primary Examiner—Donald Hajec
Assistant Examiner—Adrian Young
Attorney, Agent, or Firm—Nixon & Vanderhye

[57] ABSTRACT

Bar code data read from a bar code card (4) by a bar code reader (1) is inputted to a data processor (3). In this data processor (3), noise included in the bar code data is extracted or detected. The noise is detected by dividing the noise into noise which exists outside of a start guard bar and an end guard bar in a bar code and noise which exists between the start guard bar and the end guard bar. After the noise is detected, the data processor (3) decodes the bar code by ignoring the noise or decodes the bar code after removing the noise to correct the width of each of bars. A game set (5) also performs the same processing as that of the data processor (3) with respect to bar code data inputted from a bar code reader (10). In addition, the game set (5) uses the inputted bar code data for processing for a game.

26 Claims, 16 Drawing Sheets

FIG. 14

| SAMPLE NUMBER (DECIMAL) | ADDRESS (HEXA-DECIMAL) | DATA CONCERNING WIDTH (HEXA-DECIMAL) | TYPE OF COLOR | |
|---|---|---|---|---|
| 1 | 00 | 01 | WHITE | |
|  | 01 | A2 |  | |
| 2 | 02 | 00 | BLACK | START GUARD BAR (FRONT IDENTIFICATION SYMBOL) |
|  | 03 | 5C |  | |
| 3 | 04 | 00 | WHITE | |
|  | 05 | 48 |  | |
| 4 | 06 | 00 | BLACK | |
|  | 07 | 5B |  | |
| 5 | 08 | 01 | WHITE | FIRST DATA AREA |
|  | 09 | 0E |  | |
| 6 | 0A | 00 | BLACK | |
|  | 0B | 5D |  | |
| ⋮ | ⋮ | ⋮ | ⋮ | |
| 56 | 6E | 00 | BLACK | SECOND DATA AREA |
|  | 6F | B0 |  | |
| 57 | 70 | 00 | WHITE | |
|  | 71 | 55 |  | |
| 58 | 72 | 00 | BLACK | END GUARD BAR (REAR IDENTIFICATION SYMBOL) |
|  | 73 | 58 |  | |
| 59 | 74 | 00 | WHITE | |
|  | 75 | 5F |  | |
| 60 | 76 | 00 | BLACK | |
|  | 77 | 5C |  | |
| 61 | 78 | 01 | WHITE | |
|  | 79 | 3C |  | |

FIRST STORAGE AREA — 91
SECOND STORAGE AREA — 92
WORKING AREA — 93

| CARD NUMBER | BAR CODE DECODING DATA (PLURALITY OF DATA IN HEXADECIMAL NOTATION) | UPDATE DATA WITH PROGRESS OF DATA (PLURALITY OF DATA IN HEXADECIMAL NOTATION) |
|---|---|---|
| 1 | 00,02,09,03,⋯ 02,04 | 01,02,09,03,⋯ 03,04 |
| 2 | 03,00,04,09,⋯ 08,07 | 04,00,04,08,⋯ 07,07 |
| 3 | 07,05,04,03,⋯ 02,01 | 07,05,04,04,⋯ 02,01 |
| 4 | 08,04,05,05,⋯ 06,00 | 09,05,06,04,⋯ 06,00 |
| ⋮ | ⋮ | ⋮ |
| n | 04,01,03,02,⋯ 06,02 | 04,01,04,03,⋯ 07,03 |

BAR CODE READER AND GAME SET USING THE SAME

TECHNICAL FIELD

The present invention relates to a bar code reader and a game set using the same. More particularly, the present invention relates to an improved bar code reader capable of removing various types of noise included in bar code data and a game set using the same.

BACKGROUND ART

For example, U.S. Pat. No. 4,729,564 (hereinafter referred to as a first prior art document), Japanese Patent Laid Open Gazette No. 11183/1990 (hereinafter referred to as a second prior art document), and Japanese Patent Laid-Open Gazette No. 23592/1990 (hereinafter referred to as a third prior art document) disclose a game set playing various games on the basis of bar code data read from a bar code card. However, the first to third prior art documents utilize the bar code data read from the bar code card by a bar code reader without any modification and fail to disclose a technique for removing various types of noise included in the bar code data. Therefore, erroneous data is liable to be inputted to the game set by the bar code data including the noise. Particularly in the field of the game set, lower cost is required. Accordingly, it is impossible to use, as the bar code reader, a high-cost and high-precision one. Consequently, it is highly possible that noise is included in the bar code data read by such a bar code reader.

On the other hand, such a game set that a battle game can be played using a bar code card has been commercially available and an application for the game set has been filed in recent years (for example, a trade name "Bar Code Battler" made by Epoque Co., Ltd.; Japanese Patent Laid-Open Gazette No. 193, 074/1981). This conventional bar code game set (hereinafter referred to as a fourth prior art document) is so constructed that a battle game can be played using a bar code card produced by a player himself or herself of the game. Specifically, the player uses a bar code card attached or uses an original bar code card to which a bar code attached to a commercially available commodity is affixed and causes the game set to read the bar code card to play the battle game. In the bar code card produced by the player himself or herself, however, the bar code is generally inferior in state in many cases. Accordingly, it is very highly possible that noise is included in the bar code data read by the bar code reader. For example, when a bar code cut from a package of a commodity is bonded to a card and used, dust is liable to adhere to the bar code by adhesives squeezed from the adhesive surface. In this case, the dust adhering to the bar code is liable to be erroneously recognized as a part of a black or white bar included in the bar code. In addition, when the bar code attached to the commodity is damaged from the beginning, a read error occurs in a damaged portion. Furthermore, when the bar code attached to the commodity is copied by a copying machine and used, the shape of each of the bars in the bar code is deformed by distortion of an optical system in the copying machine. Particularly when copying of the bar code is repeated many times, the degree of deformation of each of the bars is increased. In this case, the width of each of the bars is not normally read, thereby causing a read error. However, the above described game set in the forth prior art document utilizes the bar code data read from the bar code card without any modification and fails to disclose a technique related to signal processing for removing noise included in the bar code data, similarly to the above described first to third prior art documents. Therefore, the above described game set in the fourth prior art document has the disadvantage in that a read error frequently occurs, whereby the interest in the game is lost.

Therefore, an object of the present invention is to provide an improved bar code reader capable of reliably detecting various types of noise included in bar code data and improving the reading precision of a bar code even if a relatively simple and low-cost optical reader is used.

Another object of the present invention is to provide an improved bar code reader capable of reliably detecting noise in bar code data and nullifying the same.

Still another object of the present invention is to provide an improved bar code reader capable of correcting distortion of the width of each of bars included in a bar code.

A further object of the present invention is to provide an improved bar code reader capable of correcting a read error in a bar code due to the change in the speed of movement of a bar code record medium.

A still further object of the present invention is to provide an improved game set capable of reliably detecting and nullifying various types of noise included in bar code data inputted and using the inputted bar code data for processing for a game.

DISCLOSURE OF THE INVENTION

A bar code reader according to the present invention is a device for reading bar code data from a bar code record medium on which a bar code formed by alternately arranging first bars having a relatively bright color and second bars having a relatively dark color and representing a front identification symbol and a rear identification symbol and coded data arranged between the front identification symbol and the rear identification symbol depending on the change in the width of each of the bars is recorded, comprising an optical system comprising a light emitting portion and a light receiving portion for optically reading the change in the width of each of the bars, when the relative positional relationship between the light emitting portion and the light receiving portion and the bar code record medium is changed by manually moving said bar code record medium, in relation to the change in the relative positional relationship, an aperture for regulating the relative positional relationship between a recording area of said bar code and said optical system so that the longitudinal direction of each of the bars in said bar code is approximately perpendicular to the direction of the movement of said bar record medium;

counted value data converting means for converting the change in the width of each of the bars read by the optical system into counted value data for each bar, temporary storing means for temporarily storing the counted value data for each bar obtained by the conversion by the counted value data converting means, judging means for judging whether noise is included in the bar code data read from the bar code record medium depending on whether the number of bars of the counted value data stored in the temporary storing means coincides with a predetermined number of bars, and decoding means for decoding the bar code data read from the bar code record medium on the basis of each of the counted value data stored in the temporary storing means in response to the judgement by the judging means that no noise is included in the bar code data.

In the bar code reader according to the present invention, the number of bars of the counted value data stored in the temporary storing means is compared with a predetermined number of bars, thereby to make it possible to reliably judge whether noise is included in the bar code data. Consequently, the bar code data can be prevented from being decoded in a state where noise is included, resulting in improved reading precision.

In accordance with another aspect of the present invention, the counted value data for the second bar which exists in the end out of the counted value data for the respective bars stored in the temporary storing means and the counted value data for the first bar which is the closest in the direction of the front identification symbol or in the direction of the rear identification symbol as viewed from the second bar are compared with each other, thereby to judge whether the second bar which exists in the end is noise. When it is judged that the second bar is noise, the counted value data corresponding to the second bar is nullified. consequently, noise which exists outside of the front identification symbol and the rear identification symbol can be reliably nullified.

In accordance with still another aspect of the present invention, the counted value data for the second bar which exists in the end out of the counted value data for the respective bars stored in the temporary storing means and the counted value data for the second bar which is the closest to this bar are compared with each other, thereby to judge whether the second bar which exists in the end is noise. When the second bar is noise, the counted value data corresponding to the noise is nullified. Consequently, noise which exist outside of the front identification symbol and the rear identification symbol can be reliably nullified.

In accordance with still another aspect of the present invention, the counted value data for the bar having the smallest width out of the counted value data for the respective bars stored in the temporary storing means is removed as noise so that noise which exists between the front identification symbol and the rear identification symbol is removed.

In accordance with still another aspect of the present invention, data related to distortion of the widths of the first and second bars in the bar code record medium is operated on the basis of the counted value data of the front identification symbol and/or the rear identification symbol stored in the temporary storing means, and the operated data related to distortion and the counted value data for each of the first bars or the counted value data for each of the second bars which is stored in the temporary storing means are operated so that the distortion of the widths of the first and second bars in the bar code data is corrected.

In accordance with still another aspect of the present invention, the bar code data is decoded for each predetermined very small section on the basis of a combination of the counted value data corresponding to the widths of the plurality of bars in close proximity to each other so that a read error caused by the change in the speed of the bar code record medium is corrected.

In accordance with still another aspect of the present invention, an image signal of a bar code pattern of the bar code data decoded by the decoding means and/or a numeral corresponding to the bar code data is generated and applied to image displaying means so that the results of the decoding of the bar code data are displayed and outputted such that they can be visually recognized. As a result, a user of the bar code reader can confirm whether the bar code is accurately decoded.

In accordance with still another aspect of the present invention, the bar code data decoded by the decoding means is utilized as input data for processing for a game, and an image signal for the progress of the game is generated on the basis of the input data and applied to the image displaying means.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

FIG. 14 is a memory map showing an address space of a memory used in the game set shown in FIG. 13.

BEST MODE FOR CARRYING OUT THE INVENTION

Figure 1:
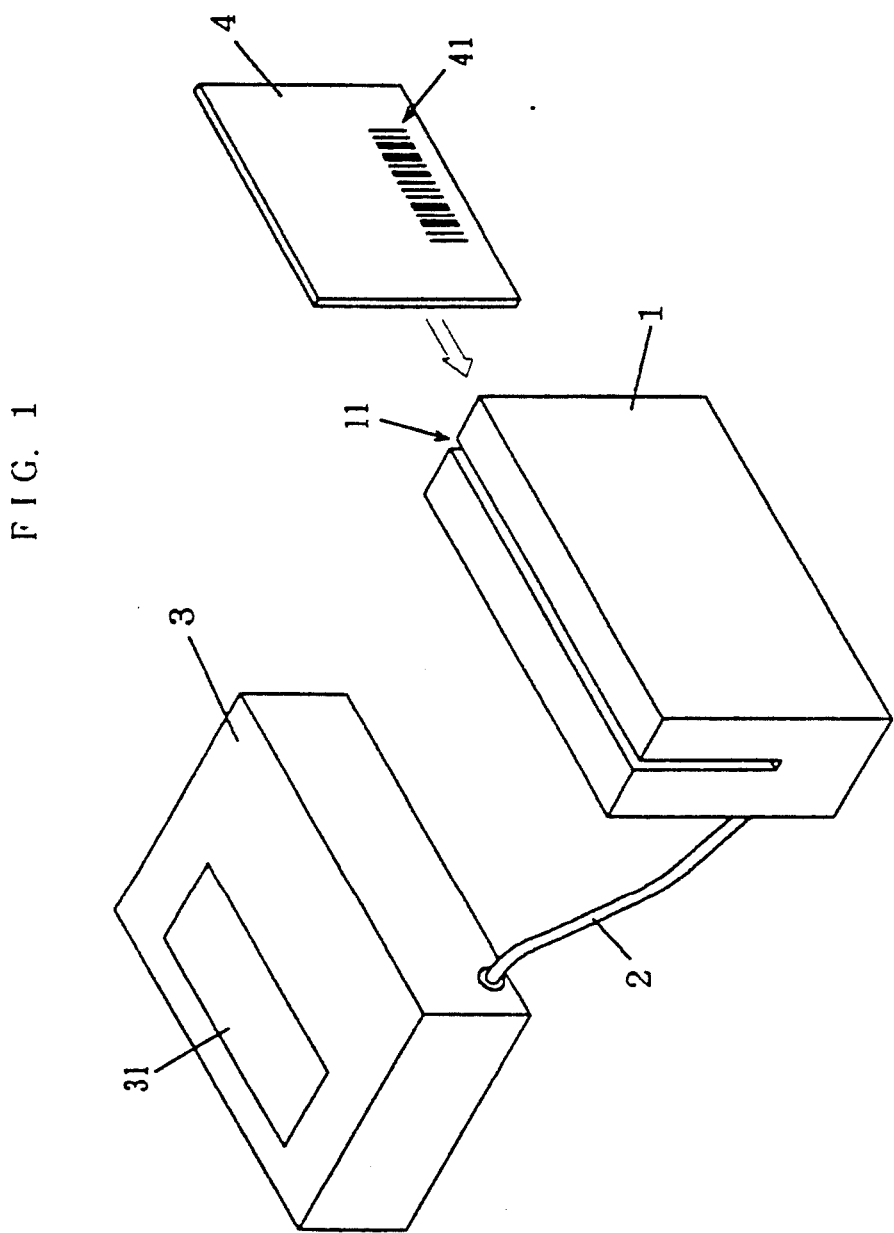
FIG. 1 is a perspective view showing the construction of one embodiment of a bar code reader according to the present invention.

FIG. 1 is a perspective view showing the construction of one embodiment of a bar code reader according to the present invention. In FIG. 1, a bar code reader 1 is connected to a data processor 3 through a connection cable 2. A sliding guide groove 11 extending along the length of the bar code reader 1 is formed in the center of the upper surface of the bar code reader 1. A bar code card 4 is slid within the sliding guide groove 11 with it being held in user's hand. At this time, the bar code reader 1 optically reads a bar code 41 recorded on the bar code card 4. Bar code data read by the bar code reader 1 is applied to the data processor 3 through the connection cable 2. The data processor 3 processes the applied bar code data, and displays the results of the processing on a display 31 constituted by, for example, a liquid crystal display.

Figure 2:
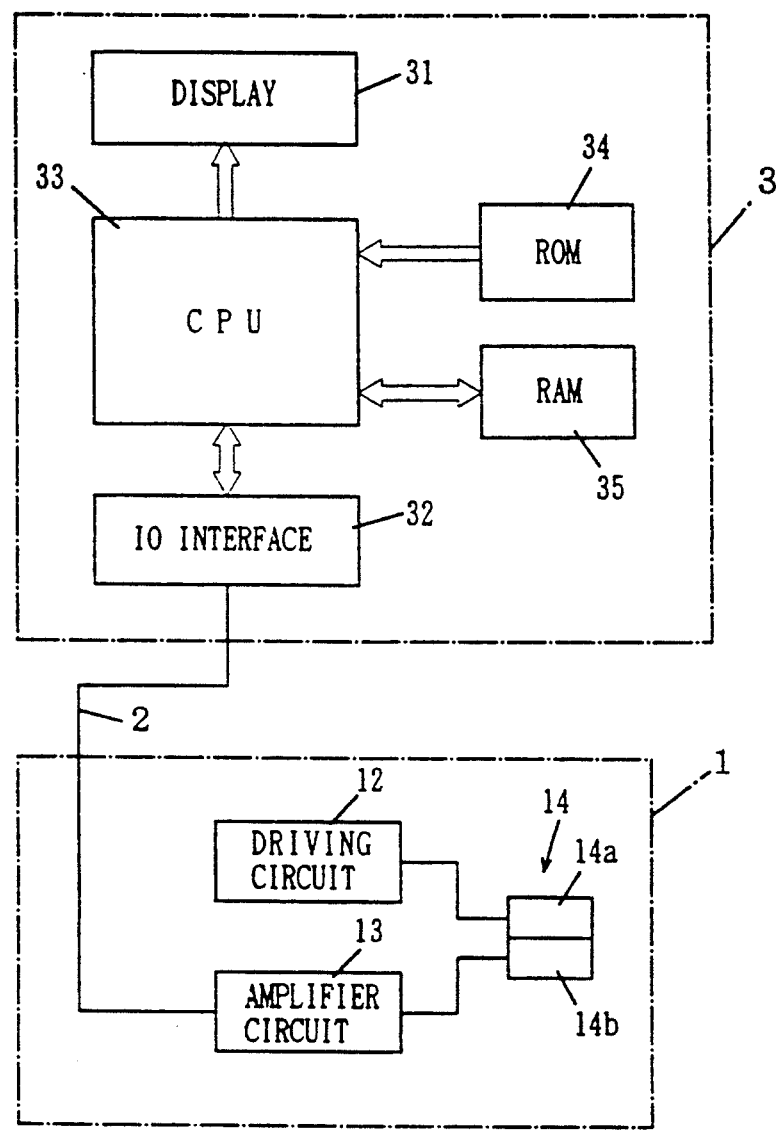
FIG. 2 is a block diagram showing the construction of an electric circuit portion of the bar code reader shown in FIG. 1.

FIG. 2 is a block diagram showing the construction of an electric circuit portion of the bar code reader shown in FIG. 1. In FIG. 2, the bar code reader 1 comprises a driving circuit 12, an amplifier circuit 13, and a light projecting and receiving unit 14. The light projecting and receiving unit 14 is constructed as a compound element obtained by integrally joining a light projecting element 14a including, for example, a light emitting diode (LED) and a light receiving element 14b including, for example, a photodiode to each other. The light projecting element 14a is driven by power supplied from the driving circuit 12. In addition, a detection signal of the light receiving element 14b is amplified and wave-shaped by the amplifier circuit 13 and then, is applied to the data processor 3 through the connection table 2.

Figure 3:
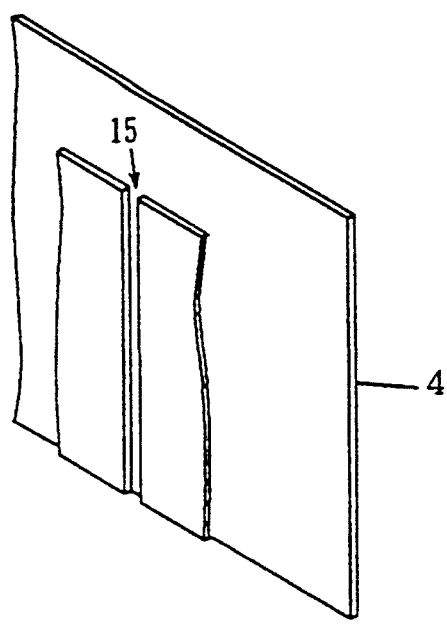
FIG. 3 is a perspective view showing the construction of a slit contained within the bar code reader shown in FIG. 1.
Figure 4:
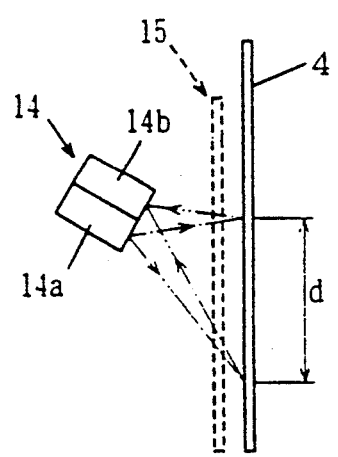
FIG. 4 is a perspective view showing the arrangement relationship of a light projecting and receiving unit contained within the bar code reader shown in FIG. 1.

As shown in FIG. 3, a slit 15 is provided so as to be opposed to the bar code card 4 inside of the sliding guide groove 11. This slit 15 extends in a direction orthogonal to the direction of sliding of the bar code card 4. In addition, the light projecting and receiving unit 14 is so arranged as to be inclined at a predetermined angle to the slit 15, as shown in FIG. 4. Specifically, the optical axes of the light projecting element 14a and the light receiving element 14b are respectively inclined at predetermined angles to the slit 15, and a surface including the optical axis of the light projecting element 14a and the optical axis of the light receiving element 14b extends along the slit 15. As described above, the slit 15 is provided between the light projecting and receiving unit 14 and the bar code card 4, thereby to make it possible to improve the reading precision of the bar code 41. For example, in a case where small noise exists in the bar code, if the bar code is read through a hole, the above described noise is read when the noise passes in front of the hole. On the other hand, if the bar code is read through the slit, the area of the noise relative to the area of bars detected through the slit is small, so that a noise detecting level is lowered or a counted value corresponding to the noise is made significantly small. Therefore, the noise is not read, resulting in improved reading precision. In addition, the light projecting and receiving unit 14 is so arranged as to be inclined at a predetermined angle to the slit 15, thereby to make it possible to enlarge a range d in which light of the light projecting element 14a is irradiated on the bar code card 4. As a result, a range in which the bar code card 4 receives light is enlarged, whereby more reflected light from the bar code card 4 can be incident on the light receiving element 14b.

Referring to FIG. 2 again, the data processor 3 comprises a display 31, an input-output (hereinafter referred to as IO) interface 32, a CPU 33, a ROM 34, and a RAM 35. The IO interface 32 controls input and output of a signal between the CPU 33 and the bar code reader 1. The CPU 33 performs a predetermined operation (for example, an operation shown in FIG. 6) in accordance with an operation program stored in the ROM 34. The ROM 34 stores an operation program for the CPU 33 in a nonvolatile manner. In addition, the RAM 35 stores various data required for data processing by the CPU 33.

Figure 5:
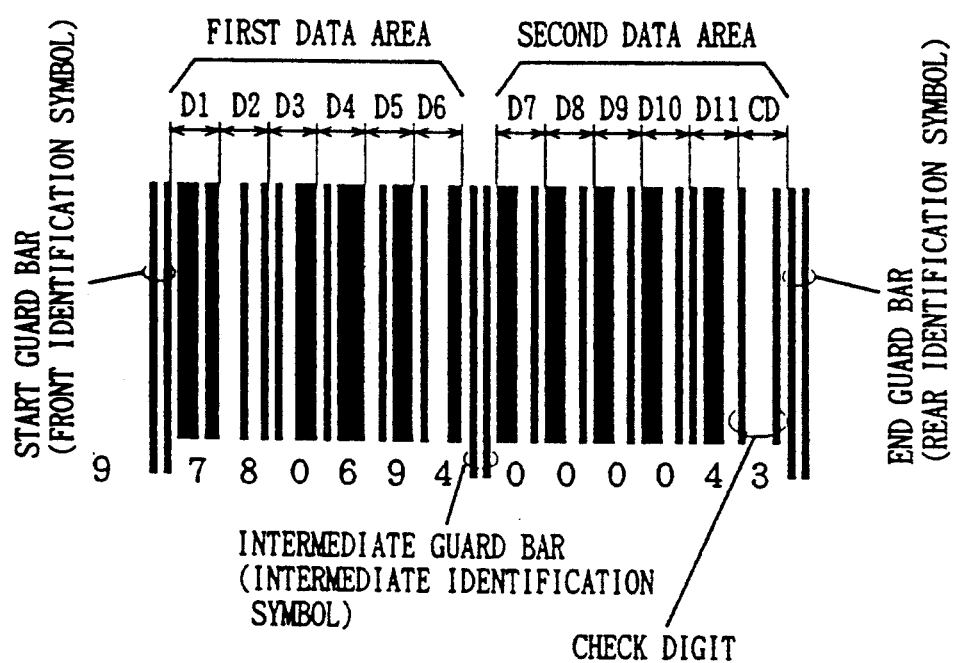
FIG. 5 is an illustration showing one example of a JAN (Japanese Article Number) code.

FIG. 5 is an illustration showing one example of the bar code read by the bar code reader shown in FIG. 1. FIG. 5 illustrates a JAN (Japanese Article Number) code used most commonly in Japan as one example of the bar code. As shown in FIG. 5, the JAN code comprises first and second data areas, a start guard bar (a front identification symbol), an intermediate guard bar (an intermediate identification symbol), and an end guard bar (a rear identification symbol). The first data area is arranged between the start guard bar and the intermediate guard bar. The second data area is arranged between the intermediate guard bar and the end guard bar. The start guard bar, the intermediate guard bar, and the end guard bar respectively represent the front end, the middle, and the rear end of the bar code. Each of them is constituted by two black bars and one white bar arranged between the black bars. The two black bars and the one white bar constituting each of the guard bars are so selected as to be equal in width to each other.

The above described first data area comprises six data code portions D1 to D6. The above described second data area comprises five data code portions D7 to D11, and a check code portion CD. Each of the data code portions D1 to D11 and the check code portion CD can be divided into seven segment regions. A numerical value assigned to the code portion is specified depending on which of the seven segment regions is painted black, that is, what value each of the widths of white and black bars arranged in the same code portion has. In the JAN code, each of the data code portions D1 to D11 and the check code portion CD is so prescribed as to represent a numerical code by a combination of two white bars and two black bars. Furthermore, in the JAN code, each of the data code portions D1 to D6 in the first data area is so prescribed that the four bars are arranged in the order of the "white bar, black bar, white bar and black bar" as viewed from the start guard bar, and each of the data code portions D7 to D11 and the check code portion CD in the second data area is so prescribed that the four bars are arranged in the order of the "black bar, white bar, black bar and white bar" as viewed from the intermediate guard bar. As a result, the data code portions D1 to D11 and the check code portion CD can respectively represent numerical values from 0 to 9 (decimal numbers).

The check code portion CD in the second data area is used as a check digit for checking to see whether or not the results of reading with respect to each of the data code portions D1 to D11 is correct. Specifically, a numerical value of this check digit is so selected as to be equal to the results of operation obtained when a predetermined operation is performed on the results of the reading with respect to each of the data code portions D1 to D11.

FIG. 5 shows a so-called normal JAN code out of JAN codes. A so-called short JAN code in which the number of bars arranged in each data area is smaller than that in the normal JAN code shown in FIG. 5 exists in addition to the normal JAN code out of the JAN codes. It is goes without saying that the present invention is also available for such a short JAN code. In addition, it should be previously noted that the present invention is available for not only the JAN codes but also other bar codes.

Referring now to flow charts of FIGS. 6 to 10, operations of the embodiment shown in FIGS. 1 and 2 will be described.

First, when the power supply (not shown) is turned on, the light projecting element 14a is lighted up by the driving circuit 12, so that the bar code reader 1 enters a bar code readable state. Specifically, when the bar code card 4 is inserted into the sliding guide groove 11 of the bar code reader 1, light emitted from the light projecting element 14a is reflected from the surface of the bar code card 4. The reflected light from the bar code card 4 is incident on the light receiving element 14b, to be converted into an electric signal. Consequently, the level of the detection signal outputted from the light receiving element 14b varies according to the brightness and darkness of the surface of the bar code card 4, that is, the bar code 41 recorded on the bar code card 4.

Figure 6:
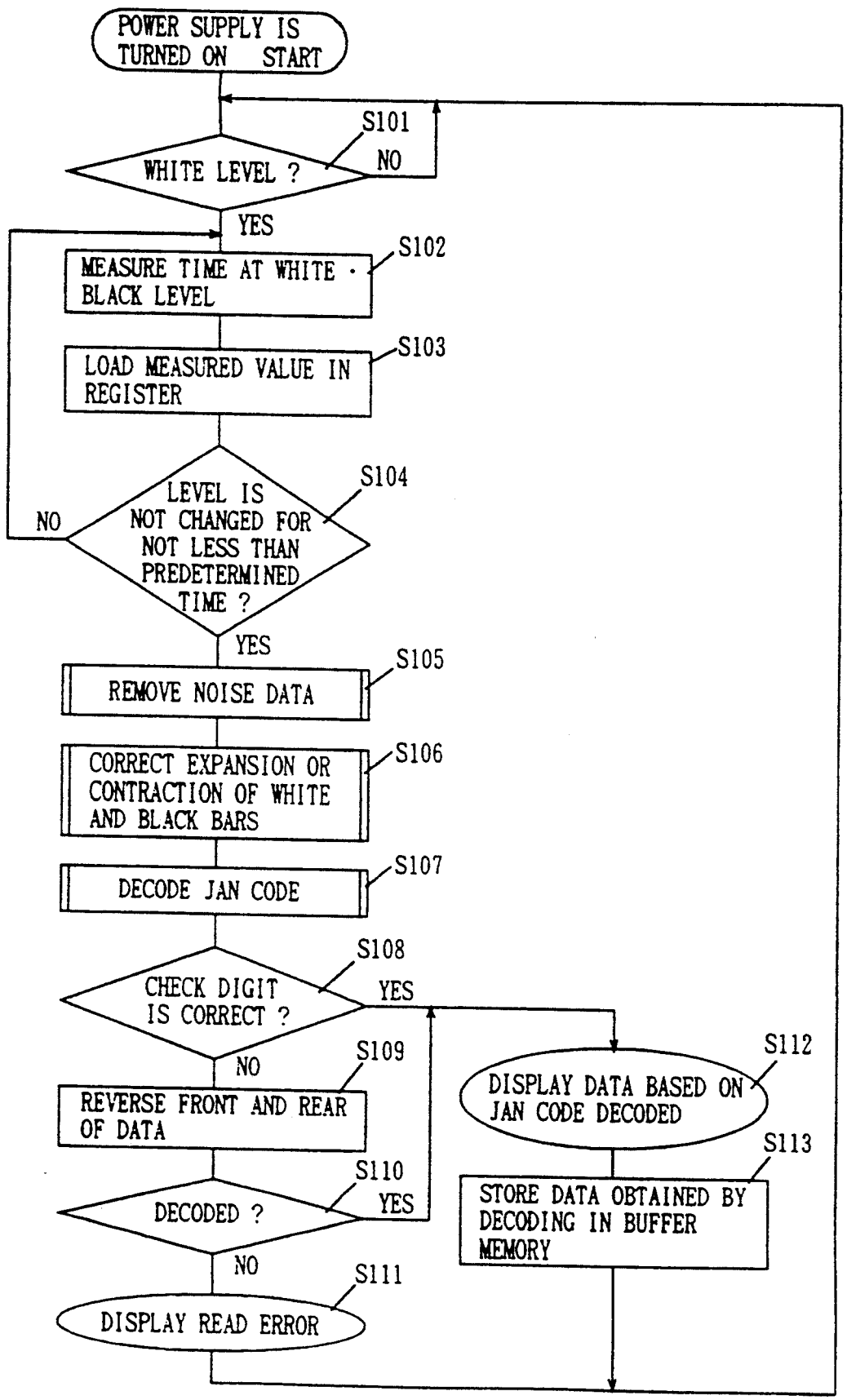
FIG. 6 is a flow chart for explaining operations of the bar code reader shown in FIGS. 1 and 2.

On the other hand, the data processor 3 also enters an operable state in response to the application of the power, to perform operations shown in FIG. 6. First, in the step S101, the CPU 33 judges whether the level of a detection output of the bar code reader 1 is a white level (a level in a case where a bright color is read). Specifically, the CPU 33 judges whether a white region on the bar code card 4 is detected by the light receiving element 14b. At this time, if the bar code card 4 is not inserted into the sliding guide groove 11 of the bar code reader 1, no reflected light is incident on the light receiving element 14b. Therefore, the level of the detection output of the bar code reader 1 becomes a black level (a level in a case where a dark color is read). The CPU 33 repeats the judging operation in the step S101 until the level of the detection output of the bar code reader 1 becomes the white level.

On the other hand, if the bar code card 4 is inserted into the sliding guide groove 11 of the bar code reader 1 and is slid, the detection output of the bar code reader 1 is changed from the black level to the white level. Therefore, the program proceeds to the step S102. In the step S102, the CPU 33 measures the time width in which the white level of the detection output of the bar code reader 1 is maintained, that is, the time width of the first white data. The time width is measured by counting the above described time width in which the white level is maintained by a counter in the CPU 33. A counted value of this counter corresponds to the width of a white region on the bar code card 4 which exists before the start guard bar. The program then proceeds to the step S103. In the step S103, the CPU 33 loads the results of the measurement in the step S102 in, for example, a register in the RAM 35. The program then proceeds to the step S104. In the step S104, the CPU 33 judges whether the change in the level of the detection output of the bar code reader 1 is stopped for not less than a predetermined time period. If the level of the detection output of the bar code reader 1 is changed before the predetermined time period has elapsed, the program proceeds to the step S102 again. In the step S102, the CPU 33 measures the time width in which the black level of the detection output of the bar code reader 1 is maintained, that is, the time width of the first black data by the counter in the CPU 33 this time. A counted value of the counter at this time corresponds to the width of the first black data in the bar code card 4 (noise which exists before the start guard bar or the first black bar in the start guard bar). This counted value of the counter is loaded in the register in the RAM 35 in the step S103. Thereafter, the operations in the steps S102 to S104 are repeated until the change in the level of the detection output of the bar code reader 1 is stopped for not less than a predetermined time period. Consequently, the widths of the white data and the black data read from the bar code 41 are measured, and are loaded in the register in the RAM 35. On the other hand, when the change in the level of the detection output of the bar code reader 1 is stopped for not less than a predetermined time period, it is considered that the reading of the bar code 41 is terminated, so that the CPU 33 proceeds to an operation in the step S105.

Figure 7:
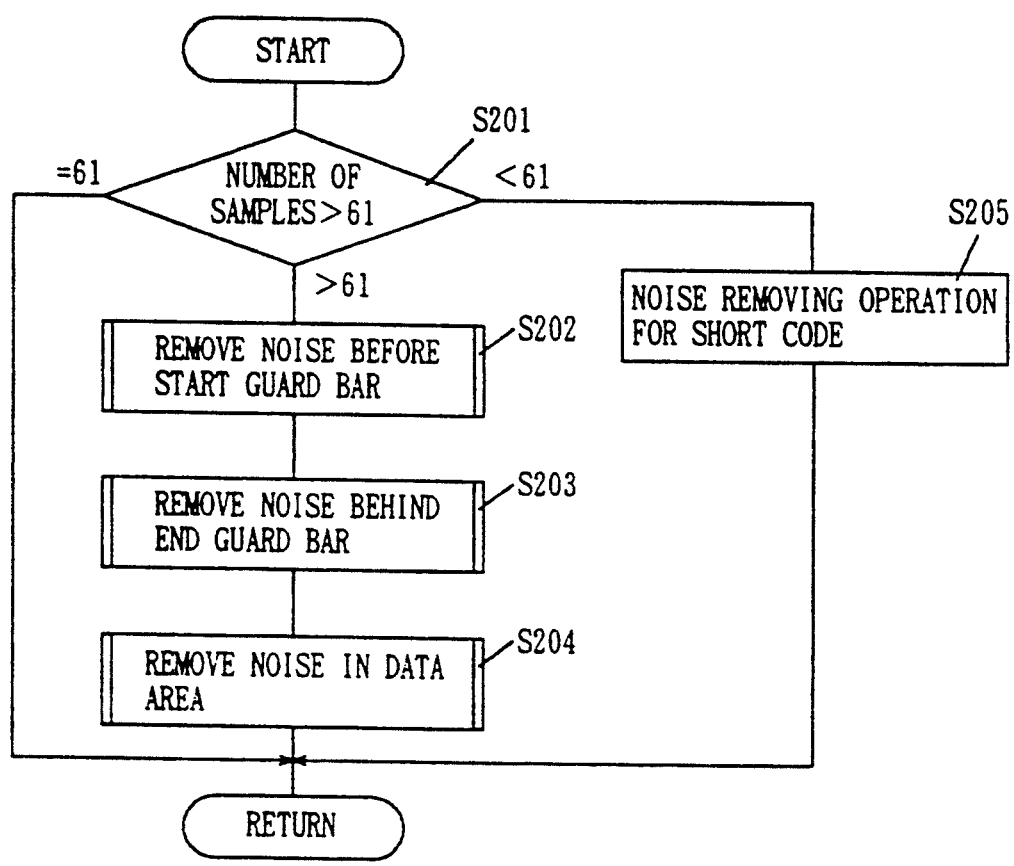
FIG. 7 is a flow chart showing a noise removing operation executed in the flow chart shown in FIG. 6 in more detail.

In the step S105, the CPU 33 removes noise from the bar code data loaded in the register in the RAM 35. The details of a subroutine in this step S105 are shown in FIG. 7. Referring to FIG. 7, the CPU 33 first judges in the step S201 whether the number of bars in the bar code data loaded in the register in the RAM 35 (the total number of white data and black data) coincides with a predetermined prescribed number "61". As apparent from FIG. 5, in the normal JAN code, it is prescribed that the sum of white regions before the start guard bar and behind the end guard bar (two), the number of white bars (29) and the number of black bars (30) is 61. Consequently, the number of bars in normal bar code data including no noise must be 61. Conversely speaking, when the number of bars in the bar code data is 61, it can be considered that no noise is included in the bar code data. When the number of bars in the bar code data coincides with the above described prescribed number "61" in the step S201, therefore, the CPU 33 is returned to the operations in a main routine shown in FIG. 6 without performing a noise removing operation. On the other hand, when the number of bars in the bar code data is larger than the above described prescribed number "61", the CPU 33 judges that noise is included in the bar code data, to remove the noise from the bar code data. In the step S202, the CPU 33 first performs an operation of removing noise which exists in the white region before the start guard bar. The details of a subroutine in this step S202 are shown in FIG. 8.

Figure 8:
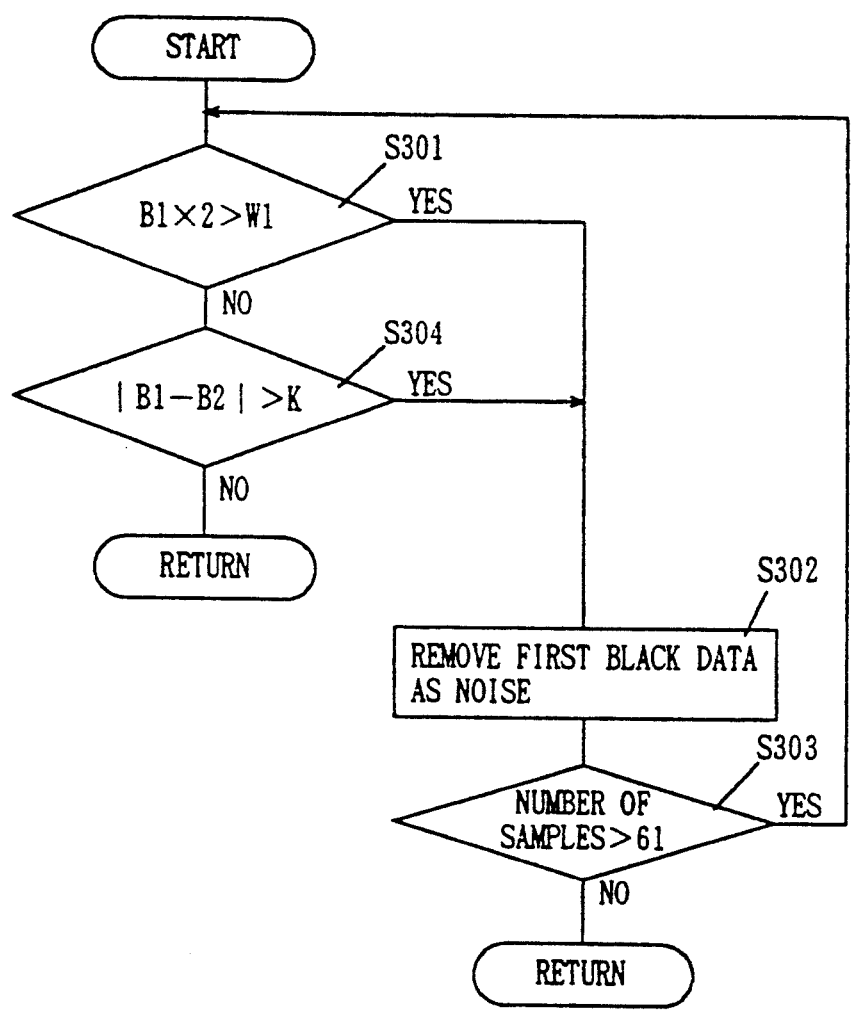
FIG. 8 is a flow chart showing a noise removing operation of noise before a start guard bar executed in the flow chart shown in FIG. 7 in more detail.

Referring to FIG. 8, the CPU 33 first judges in the step S301 whether twice a width B1 of black data on the head end of the bar code data loaded in the RAM 35 (B1×2) is larger than a width W1 of the subsequent white data. If the above described value (B1×2) is larger than the above described width W1, the program proceeds to the step S302. In the step S302, the CPU 33 removes as noise the black data on the head end of the bar code data. As described above, the widths of the black bars and the white bar in the start guard bar are so selected as to be equal to each other. In the normal bar code data, therefore, the width B1 of the black data on the head end and the width W1 of the subsequent white data must be approximately equal to each other. Nevertheless, when (B1×2) is larger than W1, that is, twice the width of the black data on the head end is larger than the width of the subsequent white data, it is very highly possible that the black data on the head end is not a part of the start guard bar but noise which exists before the start guard bar (for example, dust or a flaw). Therefore, the CPU 33 removes as noise the black data on the head end. The program then proceeds to the step S303. In the step S303, the CPU 33 judges whether the number of bars in the bar code data after the noise removal is larger than the above described prescribed number "61". If the number of bars becomes the prescribed number "61", the CPU 33 judges that all noise is removed from the bar code data, to be returned to the operations shown in FIG. 7. On the other hand, when the number of bars in the bar code data is still larger than the prescribed number "61", the CPU 33 is returned to the operation in the step S301 again, to repeat the same noise removing operation as described above.

If twice the width B1 of the black data on the head end of the bar code data (B1×2) is equal to or smaller than the width W1 of the subsequent white data, the program proceeds to an operation in the step S304 from the step S301. In this step S304, the CPU 33 judges whether the absolute value of the difference between the width B1 of the black data on the head end and the width B2 of the subsequent black data |B1−B2| exceeds a predetermined allowable value K. As described above, the widths of the two black bars in the start guard bar are so selected as to be equal to each other. In the normal bar code data, therefore, the absolute value |B1−B2| must be approximately zero. Consequently, if the absolute value |B1−B2| exceeds the allowable value K, it is very highly possible that the black data on the head end is noise which exists before the start guard bar. In this case, the program proceeds to the step S302. In the step S302, the CPU 33 removes as noise the black data on the head end. Thereafter, the CPU 33 performs the above described operation in the step S303.

On the other hand, when it is judged in the step S301 that the condition of (B1×2)≦W1 is met, and it is judged in the step S304 that the condition of |B1−B2|≦K is met, the CPU 33 judges that the removal of noise which exists in the white region before the start guard bar is terminated, to be returned to the operations shown in FIG. 7.

When the removal of the noise which exists in the white region before the start guard bar is terminated as described above, the program proceeds to the step S203 in FIG. 7. In the step S203, the CPU 33 removes noise which exists in the white region behind the end guard bar this time. Operations of a subroutine in this step S203 are approximately the same as the operations of the subroutine in the step S202 (see FIG. 8) and thus, the detailed description thereof is omitted in this specification so as to avoid the overlapped descrition. Although the bar code data loaded in the register in the RAM 35 are observed in the order from the front in the above described step S202, the bar code data is observed in the order from the rear in the step S203.

Figure 9:
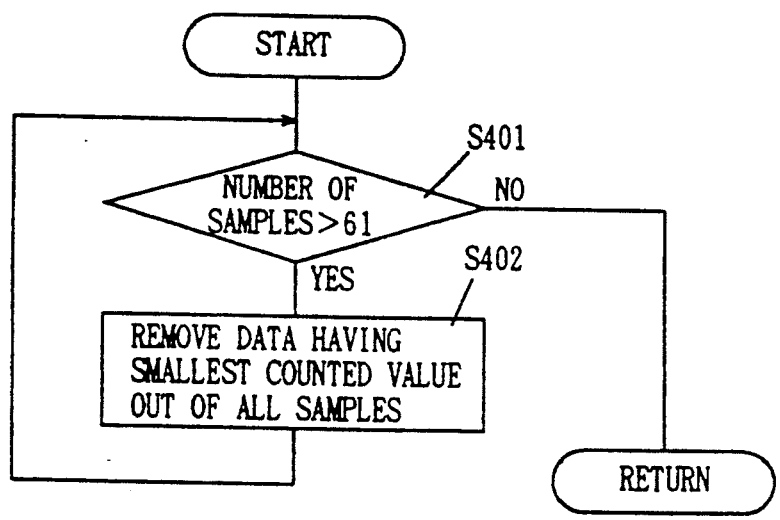
FIG. 9 is a flow chart showing another noise removing operation executed in the flow chart shown in FIG. 7 in more detail.

When the operation in the above described step S203 is terminated, the program then proceeds to the step S204. In the step S204, the CPU 33 removes noise which exists between the start guard bar and the end guard bar. The details of a subroutine in this step S204 are shown in FIG. 9. Referring to FIG. 9, the CPU 33 first judges in the step S401 whether the number of bars in the bar code data coincides with the above described prescribed number "61". If the number of bars coincides with the prescribed number "61", the CPU 33 judges that no noise exists in the bar code data, to be returned to the operations shown in FIG. 7 without performing a noise removing operation. On the other hand, if the number of bars is larger than the above described prescribed number "61", the program proceeds to the step S402. In the step S402, the CPU 33 judges that data having the smallest counted value out of all the samples is noise and removes the same. The noise removing operation in the step S402 is repeatedly performed until the above described number of bars coincides with the prescribed value "61". Consequently, noise which exists between the start guard bar and the end guard bar is removed.

When the operation in the step S204 shown in FIG. 7 is terminated, the CPU 33 is returned to the operations in the main routine shown in FIG. 6. When it is judged in the step S201 shown in FIG. 7 that the number of bars in the bar code data is smaller than the prescribed value "61", the bar code read from the bar code card 4 is a short JAN code. In this case, therefore, the CPU 33 performs a noise removing operation for the short JAN code in the step S205. The noise removing operation for the short JAN code is performed on approximately the same principle as that in the above described noise removing operation for the normal JAN code (FIGS. 8 and 9) and hence, the detailed description thereof are omitted in this specification. When the operation in the step S205 is terminated, the CPU 33 is returned to the operations in the main routine shown in FIG. 6.

Referring to FIG. 6 again, the CPU 33 then corrects expansion or contraction (distortion of the width) of the black or white bar in the bar code data in the step S106. Such expansion or contraction of the black or white bar will be caused by expansion and contraction of a mount of the bar code card 4 due to, for example, the humidity. In addition, they will be also caused when the bar code 41 is generated using copies of a bar code attached to, for example, a commercially available commodity by a copying machine. The reason for this is that an optical system in the copying machine generally has distortion, whereby the shape of the copies is deformed from the original shape. Particularly when the bar code 41 is generated through a plurality of times of copying by the copying machine, expansion or contraction of each of the bars is amplified large for each copying. The details of a subroutine in the step S106 are shown in FIG. 10.

Figure 10:
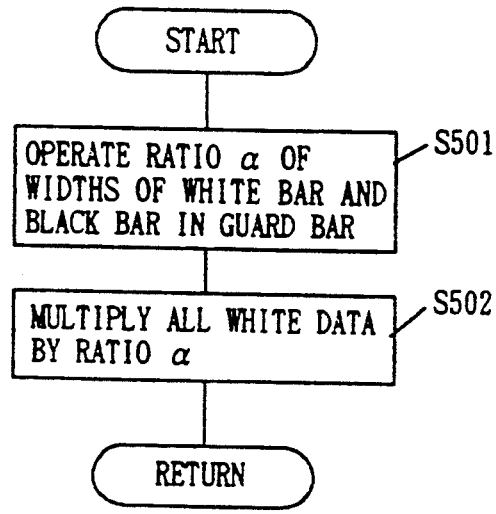
FIG. 10 is a flow chart showing a correcting operation of each bar executed in the flow chart shown in FIG. 6 in more detail.

Referring to FIG. 10, the CPU 33 first operates the ratio (distortion factor) $\alpha$ of the width of the black bar to the width of the white bar in the guard bar in the step S501. The guard bar referred to for the operation of this ratio $\alpha$ may be any one of the start guard bar, the intermediate guard bar and the end guard bar, or may be two or more guard bars. When two or more guard bars are referred to, the ratio $\alpha$ of the average value of the widths of the black bars to the average value of the widths of the white bars in the respective guard bars referred to may be operated. The program then proceeds to the step S502. In the step S502, the CPU 33 multiplies counted values of all the white data in the bar code data (data representing the width) by the ratio $\alpha$. Consequently, expansion or contraction of each of the bars in the bar code data is corrected. As described above, the widths of the black bar and the white bar in the guard bar are selected to be equal to each other. Therefore, the ratio $\alpha$ of the width of the black bar to the width of the white bar is equal to the expansion or contraction ratio of the black bars to the white bars in the whole bar code data. Consequently, the counted values of all the white data are multiplied by the above described ratio $\alpha$, thereby to make it possible to correct expansion or contraction (distortion of the width) of each of the bars in the bar code data. When the operation in the step S502 is terminated, the CPU 33 is returned to the operations in the main routine shown in FIG. 6.

Referring to FIG. 6 again, the CPU 33 decodes the JAN code in the step S107. Specifically, the CPU 33 decodes numerical values assigned to the respective data code portions D1 to D11 and the check code portion CD while correcting the change in the speed of movement of the bar code record medium by reading out from the register in the RAM 35 the bar code data from which noise data is removed and whose expansion or contraction is corrected and decoding the same for each of the code portions D1 to D11 and CD only on the basis of the correlation between the widths of the black bar and the white bar in each of the code portions or performing data conversion for each code portion on the basis of a data conversion table previously set in the ROM 34 or the like.

Figure 11:
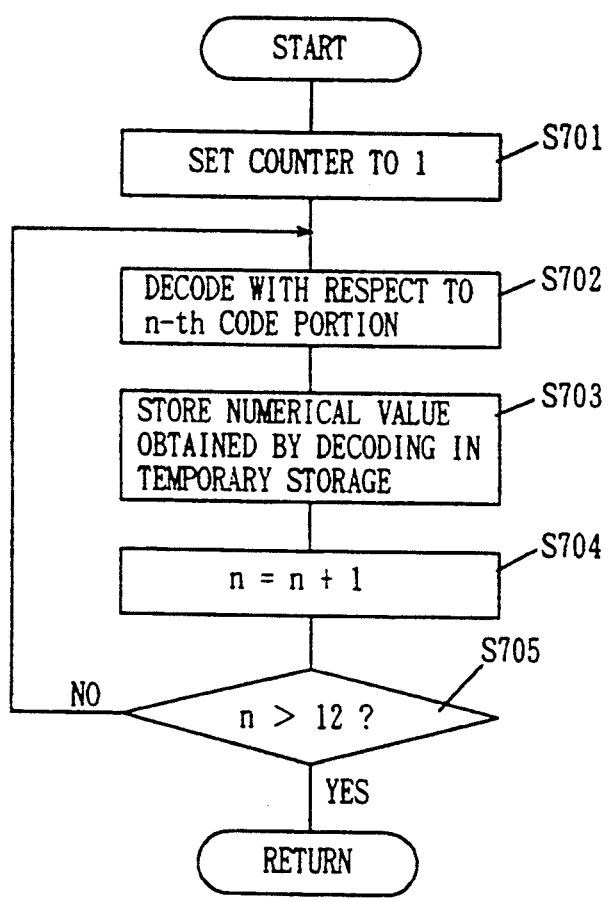
FIG. 11 is a flow chart showing a decoding operation of a JAN code executed in the flow chart shown in FIG. 6 in more detail.

FIG. 11 shows the details of a subroutine in the step S107. In FIG. 11, the CPU 33 first sets a counted value n of the counter to one in the step S701. The program then proceeds to the step S702. In the step S702, the CPU 3 decodes bar code data in a portion corresponding to the n-th code portion (first, the data code portion D1). The program then proceeds to the step S703. In the step S703, the CPU 33 stores a numerical value obtained by the decoding in the step S702 in a temporary storage (for example, the RAM 35). The program then proceeds to the step S704. In the step S704, the CPU 33 increments the counted value of the above described counter by one. The program then proceeds to the step S705. In the step S705, the CPU 33 judges whether the counted value of the above described counter exceeds 12. When the counted value of the above described counter is not more than 12, the CPU 33 repeats the operations in the steps S702 to S705 again. Thereafter, decoding is performed in the order of the data code portions D2 to D11 and the check code portion CD. When the decoding with respect to the check code portion CD is terminated, the counted value of the above described counter becomes 13. Accordingly, the CPU 33 is returned to the operations in the main routine shown in FIG. 6.

The program then proceeds to the step S108. In the step S108, the CPU 33 performs a predetermined operation on a numerical value after the decoding with respect to each of the data code portions D1 to D11 and judges whether the results of the operation coincides with a numerical value after the decoding with respect to the check code portion CD. If the above described results of the operation do not coincide with the numerical value after the decoding with respect to the check code portion CD, there is a possibility that the bar code card 4 is slid within the sliding guide groove 11 in the opposite direction, that is, with the end guard bar being on the head end. Accordingly, the program proceeds to the step S109. In the step S109, the CPU 33 reverses the front and the rear of the bar code data loaded in the register in the RAM 35, to perform a decoding operation again. The program then proceeds to the step S110. In the step S110, the CPU 33 judges whether the JAN code can be decoded. When the JAN code is impossible to decode even if the front and the rear of the bar code data is reversed, the program proceeds to the step S111. In the step S111, the CPU 33 displays on the display 31 a message indicating the occurrence of a read error. Thereafter, the CPU 33 is returned to the operation in the step S101 again.

On the other hand, when it is judged in the above described step S108 that the results of the operation on the numerical value after the decoding with respect to each of the data code portions D1 to D11 coincide with the numerical value after the decoding with respect to the check code portion CD, or when it is judged in the above described step S110 that the decoding with respect to the JAN code succeeded, the program proceeds to the step S112. In the step S112, the CPU 33 displays on the display 31 predetermined data on the basis of the JAN code decoded. For example, when the bar code reader according to the present embodiment is applied to a POS system, the price or the name of a commodity may be displayed on the display 31. In addition, when the bar code reader according to the present embodiment is applied to a card management system, management information inherent to the bar code card 4 read may be displayed on the display 31. The program then proceeds to the step S113. In the step S113, the CPU 33 stores the JAN code data decoded in the buffer memory in the RAM 35. When the operation in the step S113 is terminated, the CPU 33 is returned to the operation in the step S101 again.

As described in the foregoing, in the embodiment shown in FIGS. 1 and 2, various types of noise included in the bar code data can be reliably removed. Moreover, in the embodiment shown in FIGS. 1 and 2, the counted value data for the black bar or the white bar is decoded on the basis of the relationship between the widths of the bars in close proximity to each other within a very small section. Even if an irregularity in the speed occurs when a user slides the bar code card 4, the bar code data can be decoded without causing an error. The reason for this is that it is considered that the speed of sliding of the bar code card 4 is approximately constant within the very small section, so that an error hardly occurs in the results of the measurement of the time width between the bars to be compared with each other. In addition, in the embodiment shown in FIGS. 1 and 2, expansion or contraction of the bar code can be corrected, thereby to make it possible to further reduce the read error.

Meanwhile, the bar code reader in the embodiment shown in FIGS. 1 and 2 is applicable to various data processing systems utilizing a bar code. For example, it is applicable to a POS system, a card management system (inventory management, name card management, and the like) in a personal computer, a data input system to various household electric appliances (a picture recording data input system in a VTR, and the like), a game set playing a game using a bar code, and the like.

One embodiment of a game set using a bar code reader will be described in detail as one example of the data processing system using the bar code reader according to the present invention.

Figure 12:
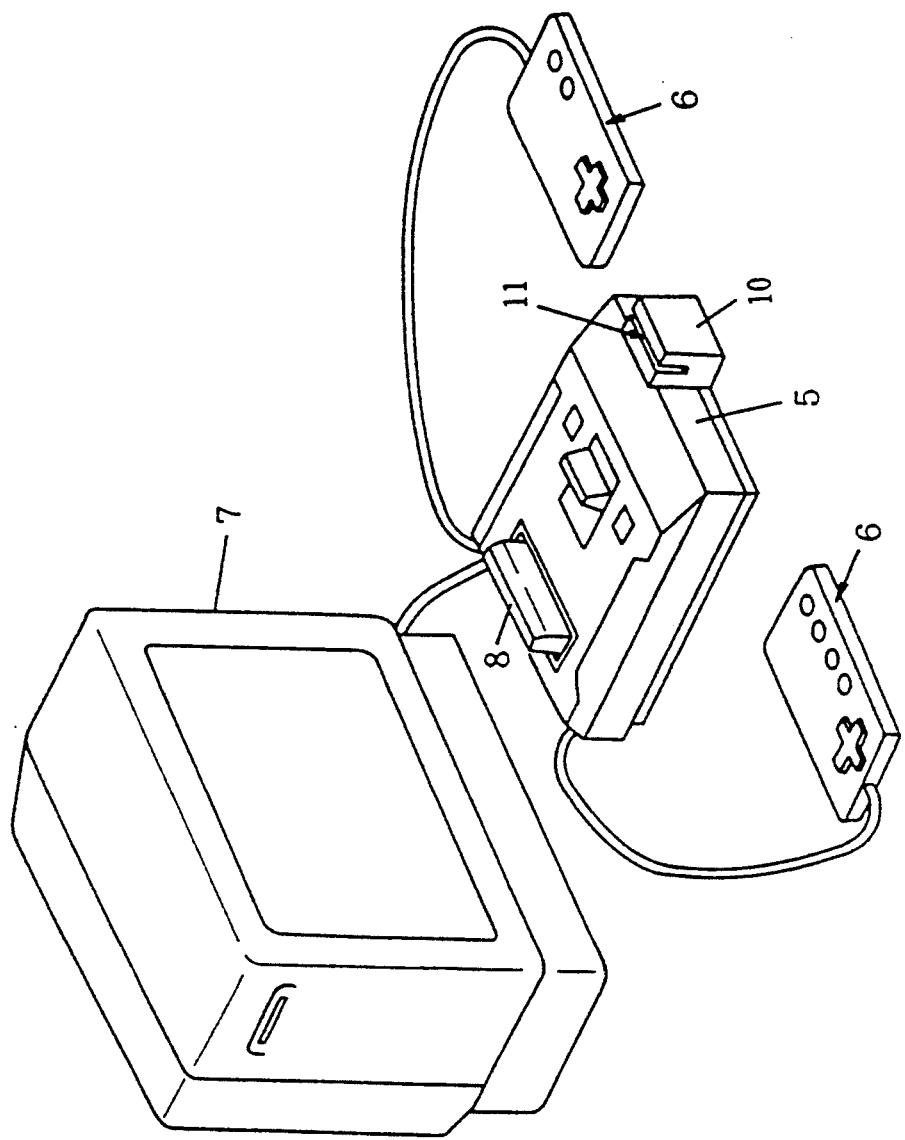
FIG. 12 is a perspective view showing the construction of a game set according to one embodiment of the present invention which plays a game using a bar code card.

FIG. 12 is a perspective view showing the construction of a game set according to one embodiment of the present invention which plays a game using a bar code card. In FIG. 12, a controller 6 and a television receiver 7 are connected to the main body of a game set (merely referred to as a "game set" hereinafter) 5. In addition, a ROM cartridge 8 is detachably mounted on the game set 5. Further, a bar code reader 10 is detachably mounted on the game set 5.

Figure 13:
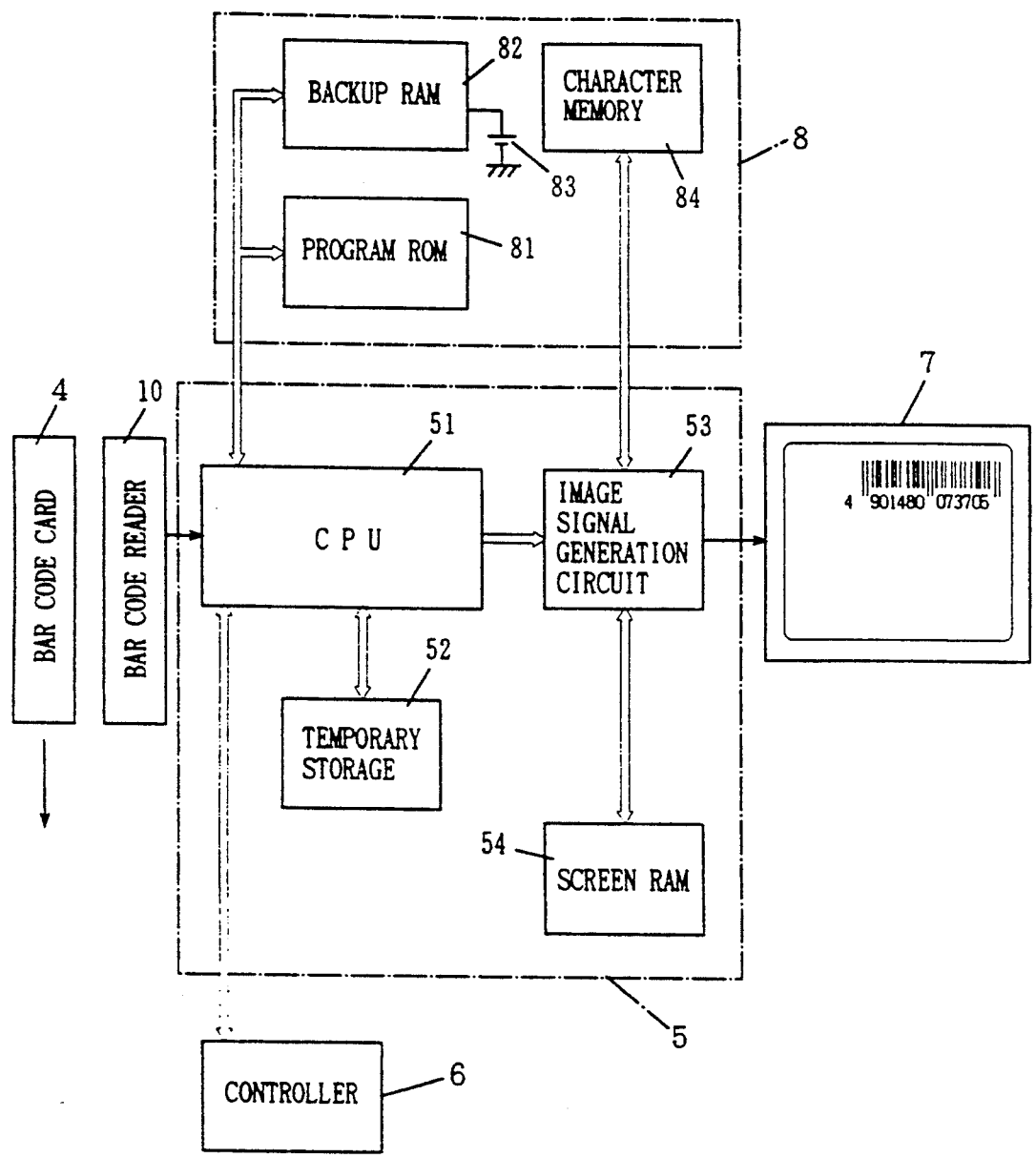
FIG. 13 is a block diagram showing the construction of an electric circuit portion of the game set shown in FIG. 12.

FIG. 13 is a block diagram showing the construction of an electric circuit portion of the game set shown in FIG. 12. In FIG. 13, the construction of the bar code reader 10 is the same as the construction of the bar code reader 1 shown in FIGS. 1 and 2 except that it is constructed detachably from the game set 5. Consequently, the bar code reader 10 comprises a sliding guide groove 11, a driving circuit 12, an amplifier circuit 13, a light projecting and receiving element 14, a slit 15 and the like and optically reads a bar code recorded on a bar code card 4, similarly to the bar code reader 1. The game set 5 comprises a CPU 51, a temporary storage 52, an image signal generating circuit 53, and a screen RAM 54. The ROM cartridge 8 comprises a program ROM 81, a backup RAM 82, a battery 83, and a character memory 84. The bar code reader 10, the controller 6, the temporary storage 52, the image signal generating circuit 53, the program ROM 81, and the backup RAM 82 are connected to the CPU 51. The screen RAM 54, the character memory 84, and the television receiver 7 are connected to the image signal generating circuit 53. The battery 83 is connected to the backup RAM 82.

The program ROM 81 stores an operation program for the CPU 51. The CPU 51 performs operations shown in, for example, FIGS. 15 to 18 in accordance with the operation program stored in the program ROM 81. The backup RAM 82 stores various parameters (scores, acquired items, a cleared stage, power of characters, and the like) to be held in the process of the progress of a game. This backup RAM 82 is backed up by the battery 83. Consequently, the backup RAM 82 holds a stored state of the above described parameters even when the supply of power from the game set 5 is stopped (for example, when the ROM cartridge 8 is pulled out of the game set 5).

The character memory 84 stores display data for various characters appearing on the game in a nonvolatile manner. As the character memory 84, a writable and readable memory (RAM) for writing display data produced by the CPU 51 in relation to bar code data read may be used. The temporary storage 52 stores various data required for data processing in the CPU 51. The screen RAM 54 stores data concerning a screen to be displayed on the television receiver 7 (coordinate data, pallet data, character code data and the like of each of the characters stored in the character memory 84). The image signal generating circuit 53 generates an image signal on the basis of the data concerning a screen which is stored in the screen RAM 54. At this time, the image signal generating circuit 53 reads out, on the basis of the code data of each of the characters stored in the screen RAM 54 (that is, data concerning a character data store address in the character memory 84), bit map data of a corresponding character from the character memory 84, further determines the position on the screen on which the above described character is to be displayed on the basis of the coordinate data, further determines a color to be displayed on the basis of the pallet data, and generates an image signal to be displayed on the television receiver 7.

FIG. 14 shows a memory map showing an address space of the temporary storage 52 and the backup RAM 82 shown in FIG. 13. A first storage area 91 shown in FIG. 14 stores bar code data read from the bar code card 4 by the bar code reader 10. FIG. 14 shows, as one example of the bar code data stored in the first storage area 91, bar code data after noise removal in detail. As apparent from FIG. 14, the bar code data includes a plurality of bar data (white data or black data). Each of the bar data included in the bar code data comprises data concerning the width of a bar (a counted value of the counter) and data concerning the type of color (white or black). In addition, a bar number is given to each of the bar data. In the first storage area 91, two addresses are assigned so as to store one bar data. For example, data concerning the width of a bar which is given a bar number "6" is stored in two addressed, that is, addresses "0A" and "0B" (hexadecimal notation). Consequently, the data concerning the width of the bar which is given a bar number "6" becomes "005D" (hexadecimal notation). Since the bar code data shown as one example in FIG. 14 is bar code data after noise removal, the number of bars in the bar code data is 61 which is prescribed in the normal JAN code. However, the number of samples in the bar code data before noise removal is more than 61, as described above. Therefore, the storage capacity of the first storage area 91 is so selected that bar code data having more than 61 bar can be also stored.

A second storage area 92 shown in FIG. 14 stores bar code decoding data with respect to each of n bar code cards. The decoding data are respectively data representing the results of decoding of the bar code data read from the bar code cards at the time of starting a game. Each of the decoding data is updated as the game proceeds, and is stored as update data in the second storage area 92. In addition, a third storage area 93 is used as a working area storing data other than the data in the first and second storage areas 91 and 92.

The bar code data stored in the above described first storage area 91 is not required after the decoding thereof. Accordingly, it is preferable that the first storage area 91 is provided on the temporary storage 52. In addition, the update data stored in the second storage area 92 must be held after the termination of the game. Accordingly, it is preferable that the second storage area 92 is provided on the backup RAM 82. It is preferable that the third storage area 93 is provided on the temporary storage 52 so as to reduce the storage capacity of the backup RAM 82.

Referring now to flow charts of FIGS. 15 to 18, description is made of operations in the embodiment shown in FIGS. 12 and 13.

Figure 15:
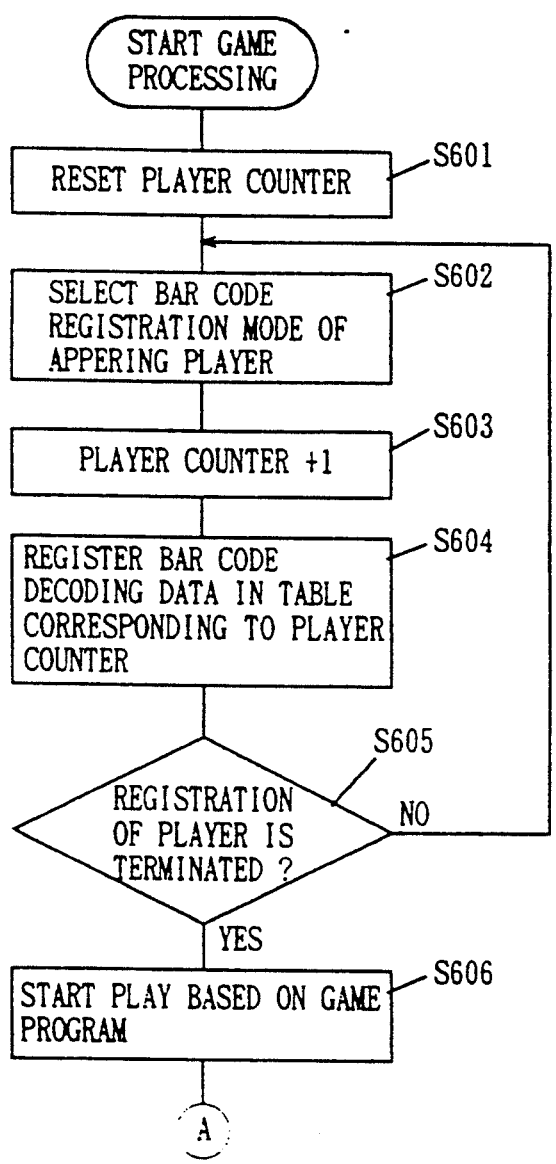
FIG. 15 is a flow chart showing a first portion of a game processing operation executed by the game set shown in FIGS. 12 and 13.
Figure 16:
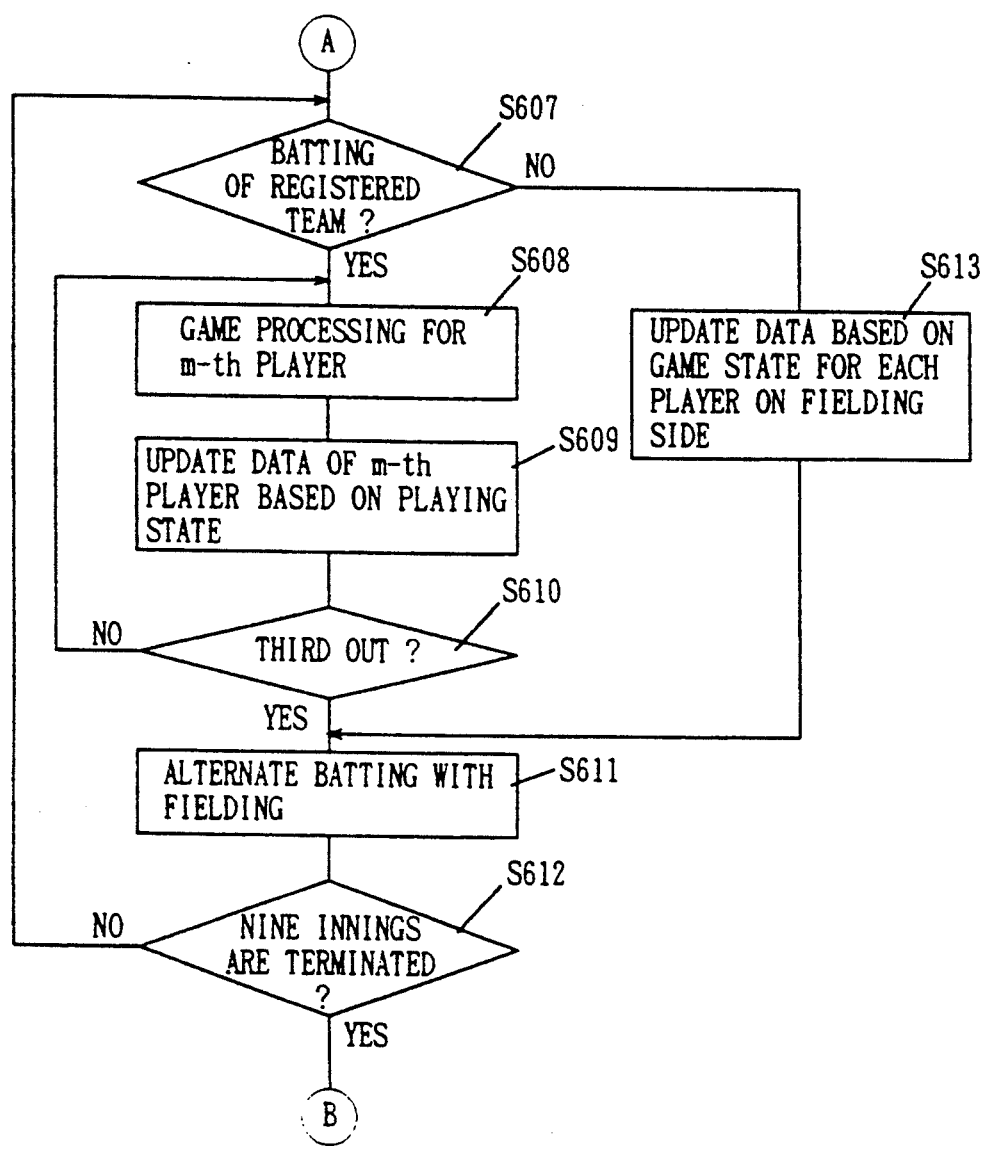
FIG. 16 is a flow chart showing a second portion of the game processing operation executed by the game set shown in FIGS. 12 and 13.
Figure 17:
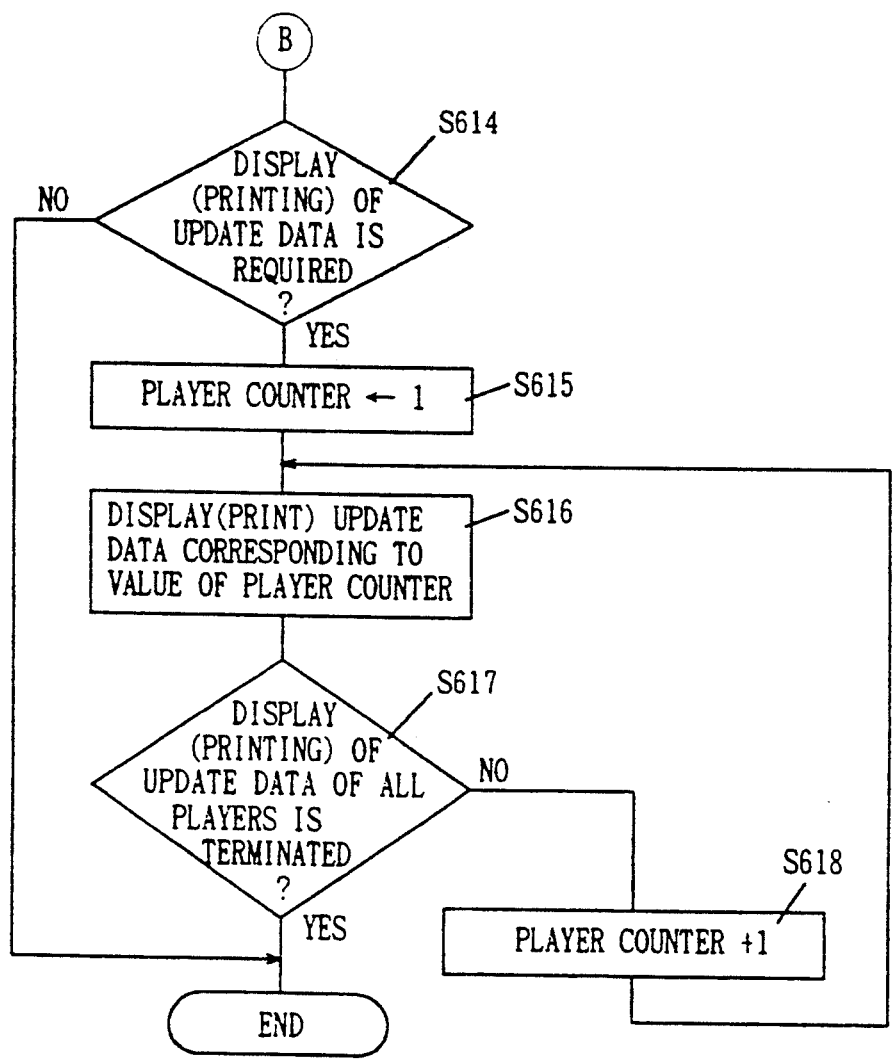
FIG. 17 is a flow chart showing a third portion of the game processing operation executed by the game set shown in FIGS. 12 and 13.

FIGS. 15 to 17 show flow charts for game processing. The flow charts of FIGS. 15 to 17 show processing for a baseball game as one example of the game processing. However, it should be previously noted that the game set according to the present invention may be constructed as game sets playing not only the baseball game but also the other types of games. When the power supply (not shown) is turned on, it is possible to read the bar code card 4 by the bar code reader 10, and game processing operations shown in FIGS. 15 to 17 are started. In the step S601 shown in FIG. 15, the CPU 51 resets a player counter provided in, for example, the third storage area 93 in the temporary storage 52. The program then proceeds to the step S602. In the step S602, a bar code registration mode of a baseball player appearing on the game is selected. The program then proceeds to the step S603. In the step S603, the CPU 51 increments the above described player counter by one. At this time, a user of the game set inserts the bar code card 4 for the first baseball player into the sliding guide groove 11 of the bar code reader 10 and slides the same. Correspondingly, the bar code reader 10 reads the bar code data from the bar code card 4 and inputs the same to the CPU 51. The bar code data inputted to the CPU 51 is utilized as various parameters concerning a corresponding baseball player (a batting average, runs batted in, the number of home runs, fielding, an earned-run average, earned runs and the like).

Figure 18:
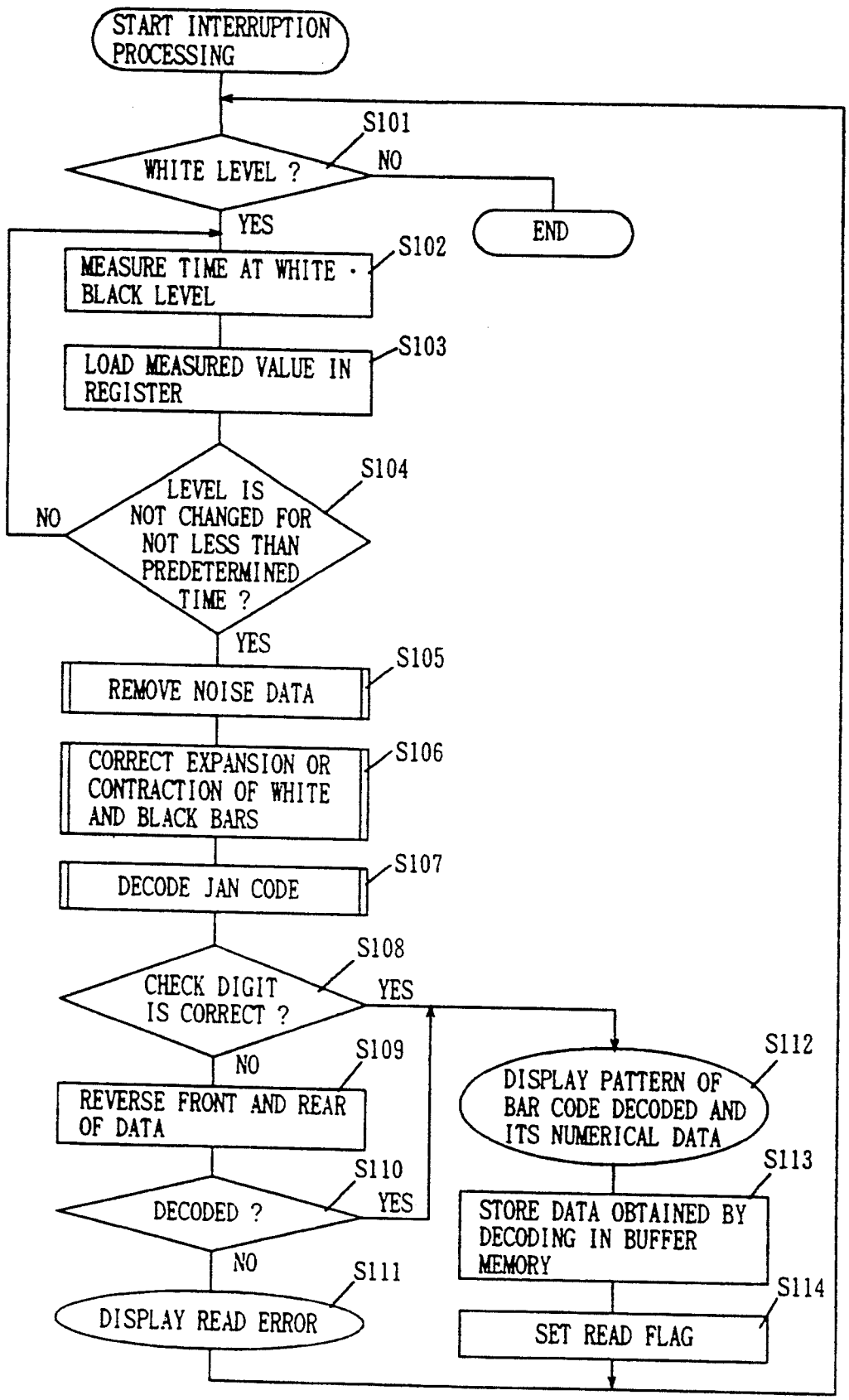
FIG. 18 is a flow chart showing an interruption processing operation executed by the game set shown in FIGS. 12 and 13.

The CPU 51 executes interruption processing shown in FIG. 18 in response to an interrupt signal generated for every, for example, 1/60 seconds. The interruption processing shown in FIG. 18 is approximately the same as the above described operations shown in the flow chart of FIG. 6. Consequently, steps, which correspond to the steps in the flow chart of FIG. 6, in the flow chart of FIG. 18 are given the same numbers and hence, the detailed description thereof is omitted. Description is mainly made of operations in portions, which differ from those in the flow chart of FIG. 6, in the flow chart of FIG. 18. First, when it is judged in the step S101 that the level of a detection output of the bar code reader 10 is not a white level, it is considered that the reading of the bar code data from the bar code card 4 is not started, so that the CPU 51 immediately terminates the interruption processing, to be returned to the game processing shown in FIGS. 15 to 17. On the other hand, when the level of the detection output of the bar code reader 10 is a white level, the CPU 51 performs the same operations in the steps S102 to S113 as those in the flow chart of FIG. 6. Specifically, the CPU 51 loads the bar code data read by the bar code reader 10 in the first storage area shown in FIG. 14 and then, removes noise included in the bar code data. In addition, the CPU 51 corrects expansion or contraction of each of the white bars and each of the black bars in the bar code data and decodes the bar code data after the correction. Subsequently, the CPU 51 displays on the television receiver 7 a pattern of each of the bars in the bar code read and a character of a numerical value obtained by the decoding (see FIG. 13). The user of the game set can thus confirm whether or not the bar code data is accurately read from the bar code card 4. Consequently, it is possible to solve the anxiety of the user that the bar code data may be erroneously read. Numerical data obtained by the decoding is stored in the third storage area 93 shown in FIG. 14 in the step S113. The program then proceeds to the step S114. In the step S114, the CPU 51 sets a read flag. Thereafter, the CPU 51 is returned to the operation in the step S101.

Referring to FIG. 15 again, the CPU 51 registers bar code decoding data in a table corresponding to the counted value of the player counter in the step S604. Specifically, the read flag is set in the above described step S114, whereby the CPU 51 registers the decoding data stored in the third storage area 93 in the above described step S113 in a card number region (first, a region given a card number 1) of the second storage area 92 which corresponds to the counted value of the player counter. The program then proceeds to the step S605. In the step S605, the CPU 51 judges whether or not the registration of parameters of all baseball players is terminated. If the registration of the parameters of all the baseball players is not terminated, the CPU 51 repeats the operations in the steps S602 to S605 again. Consequently, a plurality of bar code cards 4 are read in order by the bar code reader 10, and the parameters of the baseball players are registered from one to another. If the registration of the parameters of all the baseball players is terminated, the program proceeds to the step S606. In the step S606, the CPU 51 starts to play the baseball game based on a game program.

The program then proceeds to the step S607 shown in FIG. 16. In the step S607, the CPU 51 judges whether or not a team at bat is a registered team (a team in which parameters of each of baseball players are registered). If the team at bat is a registered team, the program proceeds to the step S608. In the step S608, the CPU 51 performs game processing for a m-th (m=1 to 9) baseball player. When the game processing in the step S608 is terminated, the program proceeds to the step S609. In the step S609, the CPU 51 updates update data, that is, parameters of the m-th baseball player which are stored in the second storage area 82 on the basis of a playing state of the m-th baseball player. The program then proceeds to the step S610. In the step S601, the CPU 51 judges whether or not the batting of the registered team is terminated, that is, the registered team is retired by the third out. If the batting of the registered team is not terminated, the CPU 51 repeats the operations in the steps S608 to 610 again.

On the other hand, if the batting of the registered team is terminated, the program proceeds to the step S611. In the step S611, the CPU 51 alternates a team at bat with a fielding team. Specifically, the registered team shall be a fielding team, and the team at the side of the game set (hereinafter referred to as a computer team) shall be a team at bat. The program then proceeds to the step S612. In the step S612, the CPU 51 judges whether or not the game is terminated, that is, the number of times of retirement exceeds nine. If the game is not terminated, the program proceeds to the step S607. In the step S607, the CPU 51 judges that the team at bat is not the registered team. The program then proceeds to the step S613. In the step S613, the CPU 51 updates update data, that is, parameters of each of the baseball players in the registered team which are stored in the second storage area 92 on the basis of a fielding state of the baseball player. When the batting of the computer team is terminated, the CPU 51 alternates the team at bat with the fielding team in the step S611. Thereafter, the operations in the steps S607 to 613 are repeated until it is judged in the step S612 that the game is terminated.

On the other hand, when the game is terminated, the program proceeds to the step S614 shown in FIG. 17. In the step S614, the CPU 51 judges whether or not display (or printing) of update data is required. If the requirement of the display (or printing) of the update data is instructed by the user of the game set (instructed by, for example, operating the controller 6), the CPU 51 judges that the display (or printing) of the update data is required, and first sets one in the player counter in the step S615. The program proceeds to the step S616. In the step S616, the CPU 51 reads out the update data of the baseball player corresponding to the counted value of the player counter from the second storage area 92 and displays on the television receiver 7 a bar code and a numerical value corresponding to the update data. In addition, when a printer (not shown) is connected to the game set 5, the CPU 51 prints on the printer the bar code and the numeral value corresponding to the update data.

The second storage area 92 is generally provided in the backup RAM 82. Accordingly, update data, that is, parameters of each of the baseball players which are stored therein are held by the battery 83 even after the termination of the game. Consequently, when the same ROM cartridge 8 is used, the parameters of the baseball player updated in the process of the game can be also used when the next game is played. When another ROM cartridge 8 (for example, a ROM cartridge 8 of the other person) is used to play the same baseball game, however, it is impossible to use for the game the parameters of each of the baseball players which have been so far grown. Therefore, the user of the game set copies the bar code and the numerical value displayed on the television receiver 7 on a card or affixes the bar code and the numerical value printed on the printer to a card to produce a new bar code card. If the bar code card is used in the next game, the parameters of each of the baseball players which have been so far grown can be used for the game.

The program then proceeds to the step S617. In the step S617, the CPU 51 judges whether or not display (or printing) of the update data for all the baseball players is terminated. When the display (or printing) of the update data for all the baseball players is not terminated, the CPU 51 increments the player counter by one in the step S618 and then, the operations in the step S616 and the subsequent steps are repeated again. On the other hand, when the display (or printing) of the update data for all the baseball players is terminated, the CPU 51 terminates the game processing.

Although the embodiment shown in FIGS. 12 and 13 is so constructed that the bar code reader 10 is detachably mounted on the game set 5, it may be constructed that the bar code reader is integrally provided for the game set.

Furthermore, although the embodiment shown in FIGS. 12 and 13 is so constructed that the game program is stored in the ROM cartridge 8 detachably mounted on the game set 5, it may be constructed that a game program is stored in a flexible magnetic disk and a CD (compact disk) in place of the ROM cartridge 8.

Additionally, the present invention is also applicable to such a game system that a plurality of game sets are connected to each other by a communication table to play a game. In this case, bar code data read from any one of the game sets may be transmitted to the other game sets through the communication table.

Although all the above described embodiments show, as one example of a method of nullifying noise data included in bar code data, that the noise data is removed from the bar code data, the present invention includes all methods for nullifying noise data detected. For example, counted value data which is judged to be noise may be flagged so as not to be treated as bar code data. Furthermore, the present invention includes a bar code reader and a game set for judging whether or not noise data is included in bar code data on the basis of the number of samples in the bar code data and decoding the bar code data only when it is judged that no noise data is included therein. In this case, it is preferable to indicate that the noise data is included in the bar code data to call a user's attention to rereading of the bar code data. If normal bar code data including no noise is read as a result of the rereading, the reading precision is consequently improved.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

As described in the foregoing, a bar code reader and a game set using the same according to the present invention are suitable for a bar code reader for reading bar code data from a bar code card which is slid by a user and a game set using the same.

What is claimed is:

1. A bar code reader for reading bar code data from a card-shaped bar code record medium on which a bar code is formed by alternately arranging first bars having a relatively bright color and second bars having a relatively dark color which represents a front identification symbol and a rear identification symbol and coded data arranged between the front identification symbol and the rear identification symbol, said coded data depending on the width of each of the bars, comprising:

an optical system having a light emitting portion and a light receiving portion for optically detecting a change in the color of each of the bars as said bar code record medium moves in relation to the optical system;

an aperture for regulating the relative positional relationship between said bar code and said optical system so that the longitudinal direction of each of the bars in said bar code is approximately perpendicular to the direction of movement of said bar code record medium;

a counter for generating count value data for each detected bar corresponding to the width of each bar;

temporary storing means for temporarily storing the count value data for each bar;

judging means for judging if noise is included in the bar code data read from said bar code record medium depending on whether the total number of bars for which count value data are stored coincides with a predetermined number of bars; and decoding means for decoding the bar code data read from said bar code record medium on the basis of each of said count value data stored in said temporary storing means in response to a judgment by said judging means that no noise is included in said bar code data.

2. The bar code reader according to claim 1, which further comprises noise nullifying means, responsive to the judgment by said judging means that noise is included in said bar code data, for extracting the count value data corresponding to the noise from the counted value data stored in said temporary storing means and nullifying the same.

3. The bar code reader according to claim 2, wherein said noise nullifying means comprises first noise nullifying means for nullifying noise which exists outside of said front identification symbol and said rear identification symbol.

4. The bar code reader according to claim 3, wherein said first noise nullifying means comprises means for comparing the counted value data for one of said second bars with the count value data for one of said first bars to judge whether said second bar is noise and nullifying the counted value data for said second bar when the second bar is noise.

5. The bar code reader according to claim 3, wherein said first noise nullifying means comprises means for comparing the counted value data for said second bar with the counted value data for another of said second bars closest to said second bar to judge whether said second bar is noise and nullifying the count value data for said second bar when said second bar is noise.

6. The bar code reader according to claim 2, wherein said noise nullifying means includes second noise nullifying means for nullifying noise which exists between said front identification symbol and said rear identification symbol.

7. The bar code reader according to claim 6, wherein said second noise nullifying means includes means for nullifying as noise the count value data for the bar having the smallest width for all the respective bars when the total number of bars exceeds the predetermined number.

8. The bar code reader according to claim 1, which further comprises:
distortion operating means for determining distortion data related to distortion of the widths of said first and second bars in said bar code data on the basis of the count value data of said front identification symbol and/or said rear identification symbol stored in said temporary storing means; and
correcting means for correcting distortion of the widths of said first and second bars in said bar code data based on said distortion data.

9. The bar code reader according to claim 1, wherein said decoding means comprises means for decoding said bar code data on the basis of a combination of count value data corresponding to the widths of a plurality of bars in close proximity to each other.

10. The bar code reader according to claim 1 wherein said decoding means decodes, when decoding of the bar code read from said bar code record medium is unsuccessful, the bar code by reversing the sequence of the count value data for each of the bars stored in said temporary storing means.

11. A bar code reader connectable to an image display device for reading bar code data from a card-shaped bar code record medium on which a bar code formed by alternately arranging first bars having a relatively bright color and second bars having a relatively dark color which represents a front identification symbol and the rear identification symbol and coded data arranged between the front identification symbol and the rear identification symbol, said coded data depending on the width of each of the bars, comprising:
an optical system having a light emitting portion and a light receiving portion for optically detecting a change in the color of each of the bars as said bar code record medium moves in relation to the optical system;
an aperture for regulating the relative positional relationship between said bar code and said optical system so that the longitudinal direction of each of the bars in said bar code is approximately perpendicular to the direction of movement of said bar code record medium;
a counter for generating count value data for each detected bar corresponding to the width of each bar;
temporary storing means for temporarily storing the count value data for each bar;
judging means for judging if noise is included in the bar code data read from said bar code record medium depending on whether the total number of bars for which count value data are stored coincides with a predetermined number of bars; and
decoding means for decoding the bar code data read from said bar code record medium on the basis of each of said count value data stored in said temporary storing means in response to a judgment by said judging means that no noise is included in said bar code data; and
bar code image signal generating means for generating an image signal of a bar code pattern of the bar code data decoded by said decoding means and applying the same to said image displaying device.

12. The bar code reader according to claim 11, which further comprises
noise nullifying means, responsive to the judgment by said judging means that noise is included in said bar code data, for extracting the count value data corresponding to the noise out of the counted value data stored in said temporary storing means and nullifying the same.

13. The bar code reader according to claim 12, wherein
said noise nullifying means comprises first noise nullifying means for nullifying noise which exists outside of said front identification symbol and said rear identification symbol.

14. The bar code reader according to claim 13, wherein
said first noise nullifying means comprises means for comparing the counted value data for one of said second bars with the count value data for one of said first bars to judge whether said second bar is noise and nullifying the counted value data for said second bar when the second bar is noise.

15. The bar code reader according to claim 13, wherein
said first noise nullifying means comprises means for comparing the counted value data for said second bar with the counted value data for another of said second bars closest to said second bar to judge whether said second bar is noise and nullifying the count value data for said second bar when said second bar is noise.

16. The bar code reader according to claim 12, wherein
said noise nullifying means includes second noise nullifying means for nullifying noise which exists between said front identification symbol and said rear identification symbol.

17. The bar code reader according to claim 16, wherein
said second noise nullifying means includes means for nullifying as noise the count value data for the bar having the smallest width for all the respective bars when the total number of bars exceeds the predetermined number.

18. The bar code reader according to claim 11, which further comprises:
distortion operating means for determining distortion data related to distortion of the widths of said first and second bars in said bar code data on the basis of the count value of said front identification symbol and/or said rear identification symbol stored in said temporary storing means; and correcting means for correcting distortion of the widths of said first and second bars in said bar code data based on said distortion data.

19. The bar code reader according to claim 11, wherein said decoding means comprising for decoding said bar code data on the basis of a combination of count value data corresponding to the widths of a plurality of bars in close proximity to each other.

20. A game set connectable to an image display device for reading bar code data from a card-shaped bar code record medium on which a bar code formed by alternately arranging first bars having a relatively bright color and second bars having a relatively dark color which represents a front identification symbol and a rear identification symbol and coded data arranged between said front identification symbol and said rear identification symbol, said coded data depending on the width of each of the bars and being used as input data for a game, comprising:

an optical system having a light emitting portion and a light receiving portion for optically detecting a change in the color of each of the bars as said bar code record medium moves in relation to the optical system;

an aperture for regulating the relative positional relationship between said bar code and said optical system so that the longitudinal direction of each of the bars in said bar code is approximately perpendicular to the direction of movement of said bar code record medium;

a counter for generating count value data for each detected bar corresponding to the width of each bar;

temporary storing means for temporarily storing the count value data for each bar;

judging means for judging if noise is included in the bar code data read from said bar code record medium depending on whether the total number of bars for which count value data are stored coincides with a predetermined number of bars;

decoding means for decoding the bar code data read from said bar code record medium on the basis of each of said count value data stored in said temporary storing means in response to a judgment by said judging means that no noise is included in said bar code data;

bar code image signal generating means for generating an image signal of a bar code pattern of the bar code data decoded by said decoding means and applying the same to said image displaying device; and game image signal generating means, utilizing the bar code data decoded by said decoding means as input data, for generating an image signal for the progress of the game on the basis of the input data and applying the image signal to said image displaying device.

21. The game set according to claim 20, which further comprises noise nullifying means, responsive to the judgement by said judging means that noise is included in said bar code data, for extracting the count value data corresponding to the noise out of the counted value data stored in said temporary storing means and nullifying the same.

22. The game set according to claim 21, wherein said counter, said judging means, said noise nullifying means, said decoding means, said bar code image signal generating means, and said game image signal generating means comprise program storing means for storing program data and program executing means for executing the program data stored in said program storing means, said program storing means storing a judgement program for judging whether noise is included in the bar code data read from said bar code medium depending on whether the total number of bars for which count value data are stored coincides with said predetermined number of samples, a noise nullification program, responsive to judgment that noise is included in said bar code data in accordance with said judgment program, for extracting the count value data corresponding to the noise out of the count value data and nullifying the same, a decoding program, responsive to judgment by said program executing means that no noise is included in the bar code data in accordance with said judgment program, for decoding the bar code data read from said bar code record medium on the basis of each of said count value data stored in said temporary storing means, a bar code image signal generation program for generating an image signal of a bar code pattern of the bar code data decoded in accordance with said decoding program and applying the same to said image displaying means, and a game image signal generation program, utilizing the bar code data decoded in accordance with said decoding program as input data for processing for the game, for generating an image signal during the progress of the game on the basis of the input data and applying the same to said image displaying means.

23. The game set according to claim 22, wherein said program storing means is contained in a cartridge detachably mounted on a body housing of said game set, the body housing of said game set comprising a writable and readable memory as said temporary storing means.

24. The game set according to claim 23, wherein said program storing means further comprises an update program for starting the game using the bar code data read from said bar code record medium before the start of the game and decoded in accordance with said decoding program as initial data of the game and updating the game related data in said writable and readable memory with the progress of the game; and a game related data output program for updating the game related data written in said writable and readable memory in accordance with said update program.

25. The game set according to claim 20, wherein said optical system is constructed detachably from the body housing of said game set.

26. The bar code reader according to claim 1, wherein said aperture comprises guiding means for guiding said bar code record medium with it being brought into contact with one side thereof.

* * * * *